United States Patent [19]
Yazaki et al.

[11] Patent Number: 4,500,597
[45] Date of Patent: Feb. 19, 1985

[54] COMPOSITE HEAT-INSULATING MATERIAL AND PROCESS FOR THE PRODUCTION THEREOF

[75] Inventors: Takao Yazaki; Kazuhide Hattori; Satoru Hattori; Kazuhide Hayama; Isao Itoh, all of Mie, Japan

[73] Assignees: Mitsubishi Petrochemical Co., Ltd.; Mitsubishi Yuka Fine Chemicals Co., Ltd., both of Tokyo, Japan

[21] Appl. No.: 634,842

[22] Filed: Jul. 26, 1984

[30] Foreign Application Priority Data

Jul. 26, 1983 [JP] Japan ................................ 58-136344
Nov. 2, 1983 [JP] Japan ................................ 58-206807

[51] Int. Cl.³ .......................... B32B 27/34; B32B 3/26
[52] U.S. Cl. ............................... 428/317.7; 264/46.8; 428/423.5; 428/476.9
[58] Field of Search ............... 428/317.1, 317.7, 423.5, 428/476.9, 319.9; 264/46.8

[56] References Cited

U.S. PATENT DOCUMENTS 3,533,901 10/1970 Sutker ............................ 428/317.1
4,097,645 6/1978 Toyoda et al. .................. 428/317.9

FOREIGN PATENT DOCUMENTS 133571 10/1979 Japan ............................... 428/319.9

Primary Examiner—William J. Van Balen
Attorney, Agent, or Firm—Sughrue, Mion, Zinn, Macpeak and Seas

[57] ABSTRACT

A composite heat-insulating material and a process for the production thereof are described. This material is of the structure that an olefin- or styrene-based resin sheet and a urethane foam material are laminated on each other with an adhesive containing: (A) 20 to 100% by weight of a water-soluble polyimine compound selected from the group consisting of polyethyleneimine, poly(ethyleneimine-urea), and a polyaminepolyamide/ethyleneimine adduct, and (B) 80 to 0% by weight of a nitrogen atom-containing cationic or amphoteric polymer. This composite heat-insulating material is very suitable for use as a lining material for a refrigerator, for example.

6 Claims, 2 Drawing Figures

COMPOSITE HEAT-INSULATING MATERIAL AND PROCESS FOR THE PRODUCTION THEREOF

FIELD OF THE INVENTION

The present invention relates to a composite heat-insulating material which is to be used as a lining material for the main body or door of a refrigerator, for example, and also to a process for producing said composite heat-insulating material. The composite heat-insulating material of the present invention is of the structure that a urethane foam and a polyolefin or styrene-based resin sheet are strongly bonded together.

BACKGROUND OF THE INVENTION

The main body or door of a refrigerator is provided with a lining material as produced from a sheet of a styrene-based resin, such as an acrylonitrile/butadiene/styrene copolymer (ABS), by vacuum molding or pressure-air molding or a combination thereof (these methods of molding are hereinafter called collectively as "differential pressure molding"). This lining material serves to prevent corrosion of a frame of stainless steel or steel which is subjected to coating with a paint followed by baking, and also provides projections necessary for holding shelves. An attempt has been made to replace ABS with polypropylene which is superior in surface luster and is low in water absorption.

In order to increase the heat-insulating properties of a refrigerator, it has been proposed to provide a urethane foam sheet between the stainless steel plate having a baked coating of the frame and the lining material. In producing such a laminated structure, however, the following problems are encountered.

(1) When a polyolefin-based resin sheet is used as a lining material, adhesion between the polyolefin-based resin sheet and the urethane foam sheet as a heat-insulating material is poor.

(2) Prior to differential pressure molding of the ABS and polyolefin-based resin sheets, it is necessary to remove dust attached onto the surface thereof with cloth, for example. This is more necessary for polypropylene because polypropylene having no polar group attracts dust more easily than ABS.

The problem (1) above can be overcome by employing a procedure comprising the steps of bonding together the lining material and the urethane foam sheet molded into the desired shapes by differential pressure molding, with a liquid acryl or epoxy-based adhesive, thereby producing a laminated member and, thereafter, pressing the laminated member to the inner surface of the stainless steel frame having a baked coating which has been coated with an adhesive. This procedure, however, will increase production cost since it involves a plurality of steps. For this reason, it is preferred to employ an in situ fabrication method as shown in FIG. 1; that is, an expandable urethane solution 4 is injected into a cavity 3 formed between a mold frame 1 and a lining material 2 and then expanded and hardened to produce a composite structure that the mold frame 1, the urethane foam 4', and the lining material 2 are combined together in one body.

The problem (2) can be overcome by introducing an antistatic agent into the sheet in the course of production thereof, or alternatively by coating an antistatic agent solution on both sides of the sheet or at least one side coming into contact with the urethane foam. In accordance with the former method, however, the desired antistatic capability can be obtained only in 30 to 50 days after molding of the sheet. During this period, therefore, it is undesirably necessary to pay attention so that the sheet does not attract dust. For these sheets produced by this method, the satisfactory antistatic capability usually obtained is in 3 to 6 months after molding thereof.

In contrast, the latter method has an advantage in that the sheet can be made antistatic in short periods of time by coating with the antistatic agent solution followed by drying. This antistatic agent, however, is required to have the following properties:

(1) it exhibits good adhesion to the sheet;
(2) it possesses stretch moldability; that is, since the sheet is subjected to differential pressure molding, the antistatic agent is also required to have extensibility as for the sheet;
(3) it is superior in adhesion to urethane foam.

SUMMARY OF THE INVENTION

As a result of extensive investigations on a coating-type adhesive which has also an antistatic capability while satisfying the above-described properties required in the in situ production of a laminated structure insulating material of urethane foam and ABS, or urethane foam and polypropylene, it has been found that a specific polymeric antistatic agent satisfies the above-described requirements (1), (2) and (3).

The present invention, in one embodiment, relates to a composite heat-insulating material of the structure that a polyolefin-based resin or styrene-based resin sheet and a urethane foam sheet are bonded together with an adhesive containing the following components (A) and (B):

| (A) | a water-soluble polyimine compound selected from the group consisting of polyethyleneimine, poly-(ethyleneimine-urea), and an ethyleneimine adduct of polyamine-polyamide, | 20 to 100% by weight |
|---|---|---|
| (B) | a cationic or amphoteric nitrogen atom-containing polymer | 80 to 0% by weight |

In another embodiment, the present invention relates to a process for producing a composite heat-insulating material which comprises:

coating both sides of a polyolefin or styrene-based resin sheet with an aqueous solution or dispersion of a polymer having the formulation as described hereinafter and also having an antistatic capability and then drying to form an antistatic resin layer on each side.

subjecting the sheet to differential pressure molding to produce a desired mold, applying an expandable urethane solution to the back of the mold, and expanding and hardening the urethane solution, whereupon there can be obtained the composite heat-insulating material of the structure that the polyolefin or styrene-based resin sheet and the urethane foam are bonded together with the antistatic resin layer as an adhesive layer.

Formulation of Polymer

| (A) | a water-soluble polyimine compound | 20 to 100% |

| | -continued | |
|---|---|---|
| | selected from the group consisting of polyethyleneimine, poly-(ethyleneimine-urea), and an ethyleneimine adduct of polyamine-polyamide, | by weight |
| (B) | a cationic or amphoteric nitrogen atom-containing polymer | 80 to 20% by weight |

Figure 1:
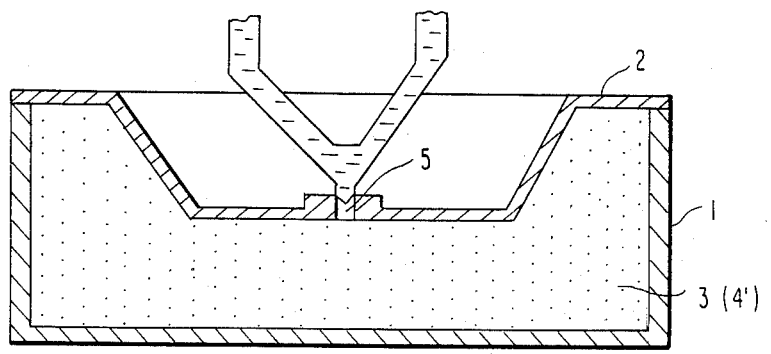
FIG. 1 is a cross sectional view illustrating an embodiment of the present invention.

1: Stainless steel frame, 2: Sheet for differential pressure molding (lining material), 2a: Adhesive (antistatic resin layer); 2b: Resin sheet, 2c: Adhesive, 3: Cavity, 4': Urethane foam, 5: Injection inlet.

DETAILED DESCRIPTION OF THE INVENTION

The resin sheets used in the present invention include a polyolefin-based resin such as high density polyethylene, low density polyethylene, polypropylene, an ethylene/propylene copolymer, an ethylene/propylene/butene copolymer, etc.; and a styrene-based resin such as polystyrene, a styrene/butadiene/styrene block copolymer (SBS), an acrylonitrile/butadiene/styrene copolymer (ABS), high impact polystyrene (HIPS), etc. These resins can be used singly or in combination with each other. Stabilizers, inorganic fillers, pigments, rubbers, and the like may be added to the resins. The resulting resin composition is formed as a sheet by extruder and, if necessary, a corona discharge treatment is applied onto both surfaces of the sheet, thereby providing a 0.3 to 4 mm thick sheet for differential pressure molding.

As an adhesive to improve adhesion of the polyolefin or styrene-based resin sheet to a urethane foam, there is used the component (A) as described above, i.e., the polyimine compounds, or a mixture of at least 20% by weight (solids base) of the component (A) and 80% by weight or less of the component (B) providing an antistatic capability, i.e., the cationic or amphoteric nitrogen atom-containing polymer. This adhesive is used as an aqueous solution of concentration of from 0.5 to 3% by weight.

In view of its antistatic and antiblocking properties, it is preferred for the adhesive to be composed of 20 to 80% by weight of the component (A) and 80 to 20% by weight of the component (B). If the component (A) content is from more than 80 to 100% by weight, the antistatic capability of the sheets does not fill its function until the sheet is subject to be vacuum-molded. In this case, therefore, it is necessary that the opposite side of the resin sheet relative to that to which the urethane foam is bonded should be coated with antistatic agents composed of 20 to 80% by weight of the component (A) and 80 to 20% by weight of the component (B), or acryl-based polymer antistatic agents of the component (B), or antistatic agents such as anionic, cationic, amphoteric, and nonionic surface active agents (e.g., sodium laurylaminopropionate, stearyltrimethylammonium chloride, a 1-hydroxyethyl-2-undecyl-2-imidazoline/ethylene oxide adduct, a nonylphenyl-/ethylene oxide adduct, and sodium laurylsulfate).

Polyethyleneimine, an ethyleneimine/urea copolymer [poly(ethyleneimine-urea)], and an ethyleneimine adduct of polyamine-polyamide as the component (A) are commercially available; for example, are sold under the trade names of Polyimine SN and Polyimine P by BASF (West Germany) and of Epomine P-1000 by Nippon Shokubai Kagaku Kogyo Co., Ltd. (Japan).

The cationic or amphoteric nitrogen atom-containing polymer as the component (B) is water-soluble and greatly contributes to the prevention of blocking of sheets and the antistatic capability. This polymer can be prepared by polymerization of quaternarized monomer of nitrogen-containing monomers, or by quaternarization of tertiary nitrogen-containing polymers.

Suitable examples of such nitrogen-containing monomers are shown below.

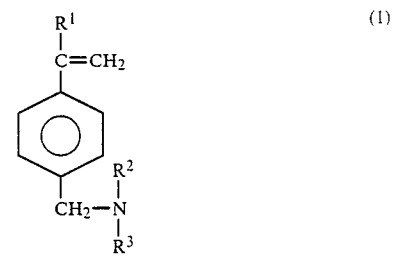
(1)

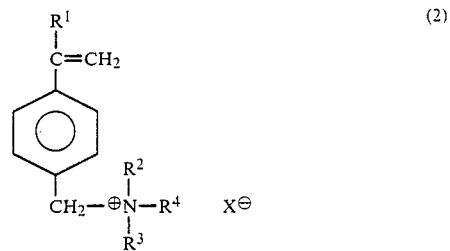
(2)

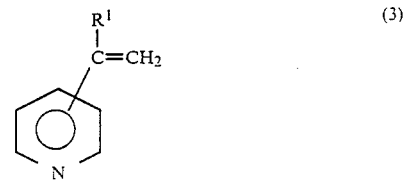
(3)

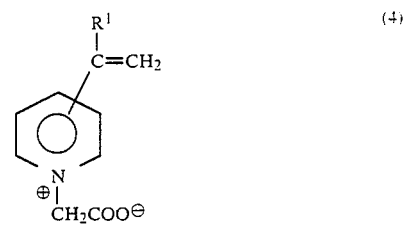
(4)

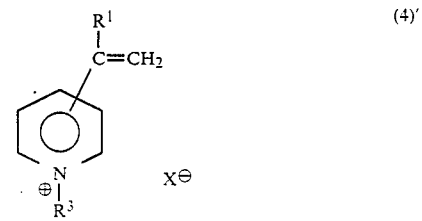
(4)'

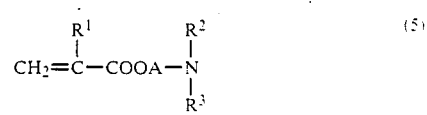
(5)

-continued

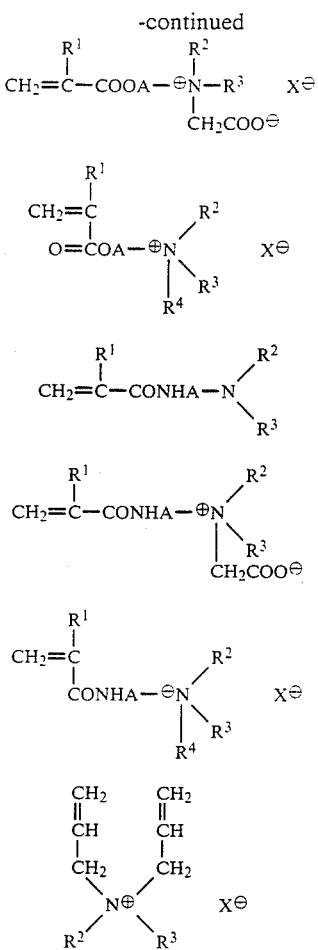

In the above formulae,

R¹ is a hydrogen atom or a methyl group,

R² and R³ are each a lower alkyl group (preferably having from 1 to 4 carbon atoms and more preferably from 1 to 2 carbon atoms), R⁴ is a saturated or unsaturated alkyl group having from 1 to 22 carbon atoms, or a benzyl group, X⁻ is a counter ion (e.g., halide, in particular, chloride) of quaternarized N⁺, and A is an alkylene group having from 2 to 6 carbon atoms.

The antistatic polymer of the component (B) can be prepared by polymerizing the above-described quaternary nitrogen-containing monomers (2), (4), (4)', (6), (6)', (8), (8)', and (9), or by copolymerizing these quaternary nitrogen-containing monomers with other vinyl monomers. Of course, there can be employed a procedure in which the tertiary nitrogen-containing monomers (1), (3), (5), and (7) are homopolymerized or copolymerized with other monomers, and then quaternarized with a cationizing agent such as alkyl halide, dimethylsulfuric acid, and benzyl halide monochloroacetic acid ester, or amphoterized with an amphoterizing agent such as monochloroacetic acid or its salt, propanesultone, and propiolactone.

The polymer of the component (B) is required to be water-soluble. It is not desirable, however, that the polymer be excessively soluble in water; that is, it has an excessively high solubility. For this reason, the tertiary or quaternary nitrogen-containing polymer is desirably a copolymer with a hydrophobic monomer. Examples of these hydrophobic monomers include styrene or its derivatives resulting from substitution in the nucleus or side chain thereof, acrylic or methacrylic acid esters, and vinyl halides.

Especially suitable polymers as the component (B) are acryl-based polymers prepared by copolymerizing the following components (a) to (c):

| (a) monomers (1) to (6) | 20 to 40% by weight |
|---|---|
| (b) $CH_2{=}\overset{R^1}{\underset{\|}{C}}{-}COOR^5$ | 6 to 80% by weight |
| (wherein $R^1$ is H or a methyl group, and $R^5$ is an alkyl group having from 1 to 18 carbon atoms) | |
| (c) hydrophobic vinyl monomer | 0 to 20% by weight |

The most suitable acryl-based polymer for use as the component (A) in the present invention is a polymer comprising a monomer (a) wherein X⁻ is Cl⁻ in the above monomer (6).

These acryl-based polymers are sold under the trade names of ST-1000, ST-1100, ST-1300, and ST-3000 by Mitsubishi Yuka Fine Co., Ltd.

Heat resistance can be imparted to the antistatic resin layer by adding a polyaminepolyamide/epichlorohydrin adduct and a surface active agent to the components (A) and (B). This polyaminepolyamide/epichlorohydrin adduct is a water-soluble, cationic thermosetting resin which is prepared by reacting polyamide with epichlorohydrin, said polyamide being derived from a saturated dibasic carboxylic acid having from 3 to 10 carbon atoms and polyalkylenepolyamine, and is sold under the trade names of Kaimen-557H by Dick Hercules Inc. and of AF-100 by Arakawa Rinsan Kagaku Kogyo Co., Ltd.

Details of the polyaminepolyamide/epichlorohydrin adduct are described in Japanese Patent Publication No. 3547/60. Typical examples of saturated dibasic carboxylic acids containing from 3 to 10 carbon atoms are dicarboxylic acids containing from 4 to 8 carbon atoms. A particularly suitable example is adipic acid. A typical example of polyalkylenepolyamine is polyethylenepolyamine, such as ethylenediamine, diethylenetriamine, and triethylenetetramine. Particularly preferred is diethylenetriamine. In the preparation of polyamide, the molar ratio of polyalkylenepolyamine to dibasic acid is usually from 0.9:1 to 1.2:1. In reacting this polyaminepolyamide with epichlorohydrin, the epichlorohydrin is usually used in an amount of from about 0.5 to about 1.8 mols per mol of each secondary amine group in the polyamide.

It is necessary that the component (A) be used in combination with the antistatic polymer of the component (B). If the components (A) and (B) are used singly, the required properties (1) to (3) as described above cannot be satisfied. Usually the component (A) is used in a proportion of from 20 to 80% by weight, preferably from 35 to 65% by weight based on the total weight of the components (A) and (B).

Figure 2:
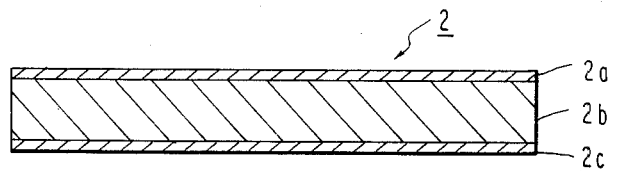
FIG. 2 is a cross sectional view of a sheet.

An aqueous solution of an antistatic agent (2a, 2c) is coated on both sides of a sheet (2b) each in an amount of from 0.01 to 1.0 g/m² (solid base) by means of, e.g., a roll, a brush, or a spray and then dried (see FIG. 2).

The thus-prepared resin sheet with the antistatic resin layers (2a, 2c) provided on both surfaces thereof is subjected to the usual differential pressure molding and molded into a suitable form for use as a lining material of a refrigerator.

The sheet 2 is, if necessary after boring therein an injection inlet 5 for a urethane solution 4, placed in a stainless steel frame or aluminum mold frame 1 as the outer structure of the refrigerator as shown in FIG. 1. Then, a two pack-type expandable urethane solution, for example, is injected through the injection inlet 5 into a cavity 4 formed between the mold frame 1 and the lining material 2. On expanding the urethane solution, there is formed a composite heat-insulating lining material comprising the urethane foam 4' and the lining material 2 strongly bonded together.

The present invention is described in greater detail with reference to the following examples. All parts and percents (%) are by weight.

PRODUCTION OF SHEET

SHEET PRODUCTION EXAMPLE 1

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer (Base Layer)

A mixture of 50% by weight of a crystalline propylene/ethylene block copolymer (ethylene content: 5% by weight; MFR: 0.5 g/10 min; boiling heptane extraction residue: 98% by weight) and 50% by weight of polyethylene (density: 0.950 g/cm$^3$; MFR: 0.6 g/10 min) was kneaded in an extruder and pelletized. The resulting composition had an MFR of 0.40 g/10 min.

The resin (ii) was fed to a two-layer multi-manifold die (width: 700 mm) at 200° to 270° C. by means of an extruder (diameter of a screw: 90 mm), and the resin (i) was fed to the same die as above at 230° to 270° C. by means of an extruder (diameter of a scres: 40 mm). The temperature of the die was set at 230° to 240° C. A molten two-ply sheet extruded from the die was cooled and solidified successively on three rolls measuring 700 mm in width and then subjected to a corona discharge treatment to produce a sheet for vacuum molding. The temperatures of the three rolls were as follows: 80° C. for the nearest roll relative to the die; 95° C. for the intermediate roll; and 100° C. for the farthest roll. The rotary speed of the rolls was 1.5 m/min. The total thickness of the sheet was 1.6 mm; the thickness of the lustrous layer was 0.25 mm; and the thickness of the deep drawing layer was 1.35 mm.

SHEET PRODUCTION EXAMPLE 2

Polypropylene (trade name: Mitsubishi Norblen MA-8, produced by Mitsubishi Petrochemical Co., Ltd.) was extruded in a sheet form at 230° C. and then subjected to a corona discharge treatment to produce a 1.6 mm thick sheet.

SHEET PRODUCTION EXAMPLE 3

An ABS resin (trade name: Toughlex 157, produced by Mitsubishi Montsant Kasei Co., Ltd.) was extruded in a sheet form at 220° C. to produce a 1.6 mm thick sheet.

SHEET PRODUCTION EXAMPLE 4

|  | Amount (parts) |
|---|---|
| Polypropylene (Mitsubishi Norblen MH-6) | 35 |
| High density polyethylene (Yukalon Hard EY-40) | 25 |
| Styrene/butadiene/styrene copolymer | 12 |
| Talc | 24 |
| Titanium oxide | 4 |

A 1.6 mm thick sheet was produced in the same manner as in Sheet Production Example 2 except that polypropylene was replaced by a resin composition consisting of the above ingredients.

SHEET PRODUCTION EXAMPLE 5

(i) Resin for Lustrous Layer (Surface Layer)

A crystalline propylene homopolymer (MFR: 2.0 g/10 min; boiling heptane extraction residue: 99% by weight) was used.

(ii) Resin Compound for Deep Drawing Layer (Base Layer)

|  | Amount (parts) |
|---|---|
| Polypropylene (Mitsubishi Norblen MH-6) | 25 |
| High density polyethylene (Yukalon Hard EY-60) | 15 |
| Styrene/butadiene/styrene block copolymer | 12 |
| Carcium carbonate | 40 |
| Polystyrene | 8 |

The above resin compound (ii) was fed to a three-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten three-ply sheet extruded from the die was cooled and solidified successively on three rolls measuring 700 mm in width and then subjected to a corona discharge treatment to produce a sheet for vacuum molding. The temperatures of the three rolls were as follows: 80° C. for the nearest roll relative to the die; 95° C. for the intermediate roll; and 100° C. for the farthest roll. The rotary speed of the rolls was 1.5 m/min. The total thickness of the sheet was 1.6 mm; the thickness of each lustrous layer was 0.2 mm; and the thickness of the deep drawing layer was 1.2 mm.

PREPARATION OF ACRYL-BASED POLYMER OF THE COMPONENT (B)

A four-necked flask equipped with a stirrer, a reflux condenser, a thermometer, and a dropping funnel was charged with 80 parts (0.5 mol) of N,N-dimethylaminoethyl methacrylate, 50 parts (0.5 mol) of methyl methacrylate, and 200 parts of isopropyl alcohol. After displacement with nitrogen gas, 0.9 part of 2,2'-azobisisobutyronitrile was added as a polymerization initiator, and polymerization was performed at 80° C. for 4 hours.

To the reaction mixture was added 60 parts of sodium monochloroacetate, which were then reacted at 80° C. for 6 hours to make the polymer amphoteric. Thereafter, water was added while distilling off isopropyl alcohol, whereupon there was obtained an aqueous solution having a solid content of 35%.

The thus-prepared acryl-based polymer (hereinafter referred to as "ST") had the following molecular chain:

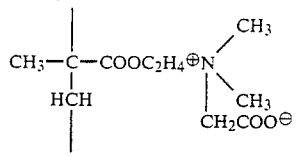

PREPARATION OF A LAMINATE OF URETHANE FOAM/RESIN SHEET

EXAMPLE 1

A 1% aqueous solution of a mixture of 25% of the acryl-based polymer prepared in the preceding example and 75% of a polyaminepolyamide/ethyleneimine adduct, Polymine SN produced by BASF (West Germany), the proportions being based on solids, was coated on both sides of the two-layer structure sheet produced in Sheet Production Example 1 each in an amount of 0.3 g/m² (solid base) and was allowed to dry.

The surface resistivity of the sheet was $1.2 \times 10^9 \Omega \cdot cm$, and its anti-blocking property was normal.

The sheet was introduced in an oven maintained at about 220° C. and was subjected to plug assist molding using a pressure-air of 5.0 kg/cm² and a vacuum of −60 mmHg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510 produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³.

After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the surface resistivity and attachment of ash. The results are shown below.

Surface resistivity*: $5.6 \times 10^{11} \Omega \cdot cm$
Attachment of ash: none
Adhesion between urethane and sheet: good (o)
Antiblocking property**: good (o)
*Measured under conditions of 20° C. and 60% RH.
**Two sheets were placed on each other in such a manner that the antistatic agent layers were in contact with each other and were allowed to stand under conditions of 20° C. and 60% RH under a load of 50 g/cm² for 24 hours. Then, adhesion between the sheets (blocking) were examined.

Good (o): No blocking
Normal (Δ): Some blocking is observed but the sheets can be easily separated from each other with hands.
Bad (×): Serious blocking

EXAMPLES 2 TO 5 AND COMPARATIVE EXAMPLES 1 TO 7

Laminates of urethane foam/resin sheet for heat-insulating materials were produced in the same manner as in Example 1 except that the ratio of "Polymine SN" to "ST" in the antistatic agent was changed as shown in Table 1.

These materials were evaluated in the same manner as in Example 1. The results are shown in Table 1.

The rating scale was as follows:
Attachment of Ash:
×: Attachment occurs at a height of 5 cm or more.
Δ: Attachment occurs at a height of from 3 to 5 cm.
o: Attachment occurs at a height of 3 cm or less or no attachment occurs.
Adhesion of Urethane to Sheet:
××: The sheet and urethane foam can be easily separated apart from each other.
×: The sheet and urethane foam can be separated apart from each other but with some difficulty.
Δ: Partial separation of the urethane foam itself occurs.
o: Entire separation of the urethane foam itself occurs.

TABLE 1

| Run No. | Antistatic Agent Polymine SN (%) | Antistatic Agent ST (%) | Physical Properties of Sheet before Differential Pressure Molding Surface Resistivity (Ω · cm) | Physical Properties of Sheet before Differential Pressure Molding Anti-Blocking Property | Laminated Heat-Insulating Material Surface Resistivity (Ω · cm) | Laminated Heat-Insulating Material Attachment of Ash | Laminated Heat-Insulating Material Anti-Blocking Property | Laminated Heat-Insulating Material Adhesion* |
|---|---|---|---|---|---|---|---|---|
| Comparative** Example 1 | — | — | $2.0 \times 10^{13} <$ | x | $2.0 \times 10^{13} <$ | x | x | xx |
| Comparative** Example 2 | — | 100 | $9.0 \times 10^7 <$ | o | $8.0 \times 10^9 <$ | x | o | x |
| Comparative** Example 3 | 87.5 | 12.5 | $6.0 \times 10^9$ | x | $1.0 \times 10^{13}$ | x | x | o |
| Comparative** Example 4 | 83.3 | 16.7 | $2.3 \times 10^9$ | Δ | $9.5 \times 10^{12}$ | Δ | Δ~o | o |
| Example 1 | 75 | 25 | $1.2 \times 10^9$ | Δ | $5.6 \times 10^{11}$ | o | o | o |
| Example 2 | 67 | 32 | $7.0 \times 10^8$ | Δ~o | $9.1 \times 10^{11}$ | o | o | o |
| Example 3 | 50 | 50 | $5.1 \times 10^8$ | o | $3.4 \times 10^{11}$ | o | o | o |
| Example 4 | 32 | 67 | $4.0 \times 10^8$ | o | $7.3 \times 10^{10}$ | o | o | o |
| Example 5 | 25 | 75 | $2.2 \times 10^8$ | o | $3.4 \times 10^{10}$ | o | o | Δ |
| Comparative Example 5 | 16.7 | 83.3 | $1.0 \times 10^8$ | o | $1.3 \times 10^{10}$ | o | o | Δ~x |
| Comparative Example 6 | 12.5 | 87.5 | $8.7 \times 10^7$ | o | $8.8 \times 10^9$ | o | o | x |
| Comparative | 100 | — | $2 \times 10^{11}$ | x | $4.5 \times 10^{13}$ | x | x | o |

TABLE 1-continued

| | Antistatic Agent | | Physical Properties of Sheet before Differential Pressure Molding | | Laminated Heat-Insulating Material | | |
|---|---|---|---|---|---|---|---|
| Run No. | Polymine SN (%) | ST (%) | Surface Resistivity ($\Omega \cdot$ cm) | Anti-Blocking Property | Surface Resistivity ($\Omega \cdot$ cm) | Attachment of Ash | Anti-Blocking Property | Adhesion* |
| Example 7 | | | | | | | | |

The symbols used in the table are as follows: o ... good, Δ ... acceptable for practical use, x ... bad
*Urethane/sheet,
**No coating of antistatic agent

EXAMPLES 6 TO 10

Laminates for heat-insulating materials were produced in the same manner as in Example 3 except that the composition of the antistatic agent (AS agent) was changed as shown in Table 2. These materials were measured for physical properties. The results are shown in Table 2.

TABLE 2

| | AS Agent | | Physical Properties of Laminated Heat-Insulating Material | | |
|---|---|---|---|---|---|
| Run No. | Component* (A) (50%) | Component (B) (50%) | Surface Resistivity ($\Omega \cdot$ cm) | Anti-Blocking-Property | Adhesion |
| Example 6 | Polymine P | ST-1000 | $4 \times 10^8$ | o | o |
| Example 7 | Epomine P-1000 | ST-1100 | $6 \times 10^8$ | o | o |
| Example 8 | Polymine SN | ST-3000 | $7 \times 10^7$ | o | o |
| Example 9 | " | ST-3100 | $9 \times 10^7$ | o | o |
| Example 10 | Epomine P-1000 | ST-3100 | $8 \times 10^7$ | o | o |

*Component (A): Polymine P ... Polyethyleneimine produced by BASF
Epomine P-1000 ... Polyethyleneimine produced by Nippon Shokubai Kasei Co., Ltd.

EXAMPLES 11 TO 13

Laminates of urethane foam/sheet for heat-insulating materials were produced in the same manner as in Example 3 except that the sheets obtained in Sheet Production Examples 2 to 4 were used in place of the sheet obtained in Sheet Production Example 1.

Physical properties of the materials are shown in Table 3.

TABLE 3

| | | Physical Properties of Laminated Heat-Insulating Material | | | |
|---|---|---|---|---|---|
| | | Surface Resistivity ($\Omega \cdot$ cm) | | | |
| Run No. | Sheet of Sheet Production Example | 1 Day after Molding | 2 Months after Molding | Anti-Blocking Property | Adhesion |
| Example 3 | Sheet Production Example 1 | $5.6 \times 10^{12}$ | $6.0 \times 10^{12}$ | o | o |
| Example 11 | Sheet Production Example 2 | $9.1 \times 10^{11}$ | $1.0 \times 10^{12}$ | o | o |
| Example 12 | Sheet Production Example 3 | $3.4 \times 10^{11}$ | $4.2 \times 10^{11}$ | o | o |
| Example 13 | Sheet Production Example 4 | $7.3 \times 10^{10}$ | $9.5 \times 10^{10}$ | o | o |

EXAMPLE 14

A 1% aqueous solution of a mixed polymer of 35% of the acryl-based polymer prepared in the above-described example and 65% of a polyaminepolyamide/ethyleneimine adduct, Polymine SN produced by BASF, the proportions being based on the solids, was coated on both sides of the two-layer structure sheet obtained in Sheet Production Example 1 each in an amount of 0.3 g/m² (solid base) and then was allowed to dry.

The surface resistivity of the above-produced sheet was 6.5 $10^8 \Omega \cdot$cm, and its anti-blocking property was normal.

The sheet was introduced in an oven maintained at about 220° C. and was subjected to plug assist molding using an air-pressure of 5.0 kg/cm² and a vacuum of −600 mmHg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510 produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³.

After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the surface resistivity and attachment of ash. The results are shown below.

Surface resistivity: $8.8 \times 10^{11} \Omega \cdot cm$
Attachment of ash: none
Adhesion between urethane and sheet: good (o)
Anti-blocking property: good (o).

EXAMPLES 15 TO 18 AND COMPARATIVE EXAMPLE 8

Laminates of urethane foam/sheet for heat-insulating materials were produced in the same manner as in Example 14 except that the ratio of "Polymine SN" to "ST" was changed as shown in Table B 4 and, furthermore, the antistatic agent was not coated on the surface lustrous layer.

These materials were evaluated in the same manner as in Example 1. The results are shown in Table 4.

EXAMPLES 18 AND 19 AND COMPARATIVE EXAMPLES 9 TO 14

Laminates of urethane foam/sheet for heat-insulating materials were produced in the same manner as in Example 14 except that the type of the antistatic agent to be coated on the lustrous layer of the sheet (obverse side) and that to be coated on the other side of the sheet (reverse side) were changed as shown in Table 4.

TABLE 4

| | Antistatic Agent Composition | | | Physical Properties of Sheet before Differential Pressure Molding | | | |
|---|---|---|---|---|---|---|---|
| | Reverse Side | | | Surface resistivity ($\Omega \cdot cm$) | | Anti-blocking Property | |
| Run No. | Polymine SN (%) | ST (%) | Obverse Side (%) | Reverse Side | Obverse Side | Reverse Side | Obverse Side |
| Example 14 | 65 | 35 | Polyimine SN (65), ST (35) | $6.5 \times 10^8$ | $6.5 \times 10^8$ | o | o |
| Example 15 | 65 | 35 | — | $6.5 \times 10^8$ | $3 \times 10^{13}<$ | o | o |
| Example 16 | 50 | 50 | — | $5.2 \times 10^8$ | $3 \times 10^{13}<$ | o | o |
| Example 17 | 30 | 70 | — | $3.6 \times 10^8$ | $3 \times 10^{13}<$ | o | o |
| Example 18 | 50 | 50 | "Electrostripper QN" produced by Kao Sekken Co., Ltd. (100) | $5.2 \times 10^8$ | $1.4 \times 10^8$ | o | Δ |
| Example 19 | 100 | — | Polyimine SN (50), ST (50) | $3 \times 10^{11}$ | $4.5 \times 10^8$ | x | o |
| Comparative Example 8 | — | — | — | $3 \times 10^{13}<$ | $3 \times 10^{13}<$ | o | o |
| Comparative Example 9 | — | — | "Electrostripper QN" produced by Kao Sekken Co., Ltd. (100) | $3 \times 10^{13}<$ | $1.6 \times 10^8$ | o | x~Δ |
| Comparative Example 10 | "Electrostripper QN" produced by Kao Sekken Co., Ltd. (100) | | "Electrostripper QN" produced by Kao Sekken Co., Ltd. (100) | $1.4 \times 10^8<$ | $1.6 \times 10^8$ | o | o |
| Comparative Example 11 | — | — | Polyimine SN (50), ST (50) | $3 \times 10^{13}<$ | $4.5 \times 10^8$ | x | o |
| Comparative Example 12 | "PQ A" produced by Soken Kagaku Co., Ltd. (100) | | Polyimine SN (50), ST (50) | $1.5 \times 10^8$ | $4.5 \times 10^8$ | o | o |
| Comparative Example 13 | "ST-1000" produced by Mitsubishi Yuka Fine Co., Ltd. (100) | | Polyimine SN (50), ST (50) | $4.0 \times 10^9$ | $4.2 \times 10^8$ | o | o |
| Comparative Example 14 | Polyimine SN (12.5) | ST (87.5) | Polyimine SN (50), ST (50) | $2.8 \times 10^8$ | $4.5 \times 10^8$ | o | o |

| | Laminate for a Heat-Insulating Material | | | | |
|---|---|---|---|---|---|
| | Surface Resistivity ($\Omega \cdot cm$) | | Attachment of Ash | Anti-Blocking Property | Adhesion |
| Run No. | Reverse Side | Obverse Side | Obverse Side | Obverse Side | Reverse Side |
| Example 14 | $8.9 \times 10^{11}$ | $8.9 \times 10^{11}$ | o | o | o |
| Example 15 | $8.9 \times 10^{11}$ | $3 \times 10^{13}<$ | x | o | o |
| Example 16 | $3.7 \times 10^{11}$ | $3 \times 10^{13}<$ | x | o | o |
| Example 17 | $6.8 \times 10^{11}$ | $3 \times 10^{13}<$ | x | o | o |
| Example 18 | $8.8 \times 10^{11}$ | $5.8 \times 10^{11}$ | o | Δ | o |
| Example 19 | $3 \times 10^{13}$ | $4.2 \times 10^{11}$ | o | o | o |
| Comparative Example 8 | $3 \times 10^{13}<$ | $3 \times 10^{13}<$ | x | o | x |
| Comparative Example 9 | $3 \times 10^{13}<$ | $5.8 \times 10^{11}$ | Δ | o | x |
| Comparative Example 10 | $6.0 \times 10^{11}$ | $6.0 \times 10^{11}$ | o | o | x |
| Comparative Example 11 | $3 \times 10^{13}<$ | $4.2 \times 10^{11}$ | o | o | x |
| Comparative Example | $2.6 \times 10^{12}$ | $3.8 \times 10^{11}$ | o | o | x |

TABLE 4-continued

| | | | | | |
|---|---|---|---|---|---|
| Example 12 Comparative Example 13 | $4.2 \times 10^{12}$ | $4.0 \times 10^{11}$ | o | o | x |
| Comparative Example 14 | $8.8 \times 10^9$ | $4.0 \times 10^{11}$ | o | o | x |

Note: The symbols used in the rating are defined as follows:
o ... Good, Δ ... Acceptable for practical use, x ... Bad

EXAMPLES 20 TO 24

Laminated heat-insulating materials were produced in the same manner as in Example 18 except that the composition of the antistatic agent (AS agent) to be coated on the reverse side of the sheet, i.e., the side coming into contact with the urethane foam, was changed as shown in Table 5. Physical properties of the materials are shown in Table 5.

ample 18 except that the sheets obtained in Sheet Production Examples 2 to 5 were used in place of the sheet obtained in Sheet Production Example 1.

Physical properties of the materials are shown in Table 6.

EXAMPLES 29 TO 31

Laminated heat-insulating materials were produced in the same manner as in Example 28 except that the

TABLE 5

| | AS Agent | | Physical Properties of Laminated Heat-Insulating Materials | | | Resistivity of the Lustrous Layer Side of the Sheet before |
|---|---|---|---|---|---|---|
| Run No. | Component (A)* (50%) | Component (B) (50%) | Surface Resistivity (Ω · cm) | Anti-Blocking Property | Adhesion | Differential Pressure Molding (Ω · cm) |
| Example 20 | Polyimine P | ST-1000 | $4.2 \times 10^{12}$ | o | o | $2.5 \times 10^8$ |
| Example 21 | Epomine P-1000 | ST-1100 | $4.2 \times 10^{12}$ | o | o | $2.6 \times 10^8$ |
| Example 22 | Polymine SN | ST-3000 | $3.0 \times 10^{12}$ | o | o | $1.4 \times 10^8$ |
| Example 23 | " | ST-3100 | $4.0 \times 10^{11}$ | o | o | $1.6 \times 10^8$ |
| Example 24 | Epomine P-1000 | ST-3100 | $5.5 \times 10^{11}$ | o | o | $1.8 \times 10^8$ |

*Component (A)
Polyimine P ... Polyethyleneimine produced by BASF
Epomine P-1000 ... Polyethyleneimine produced by Nippon Shokubai Kasei Co., Ltd.

EXAMPLES 25 TO 28

Laminates of urethane foam/sheet for heat-insulating materials were produced in the same manner as in Excomposition of the antistatic agent was changed as shown in Table 6.

TABLE 6

| | | Antistatic Agent | | | Physical Properties of Sheet before Differential Pressure Molding | | | |
|---|---|---|---|---|---|---|---|---|
| | | Reverse Side of Sheet | | | Surface Resistivity (Ω · cm) | | Anti-Blocking Property | |
| | | Polymine | | | | | | |
| Run No. | Sheet of Sheet Production Example | SN (%) | ST (%) | Obverse Side of Sheet | Reverse Side | Obverse Side | Reverse Side | Obverse Side |
| Example 25 | Sheet Production Ex. 2 | 50 | 50 | Electrostripper QN produced by Kao Sekken Co., Ltd. | $5.2 \times 10^8$ | $1.8 \times 10^8$ | o | x~Δ |
| Example 26 | Sheet Production Ex. 3 | 50 | 50 | Electrostripper QN produced by Kao Sekken Co., Ltd. | $3.8 \times 10^8$ | $1.2 \times 10^8$ | o | x~Δ |
| Example 27 | Sheet Production Ex. 4 | 50 | 50 | Electrostripper QN produced by Kao Sekken Co., Ltd. | $5.5 \times 10^8$ | $1.5 \times 10^8$ | o | x~Δ |
| Example 28 | Sheet Production Ex. 5 | 50 | 50 | Electrostripper QN produced by Kao Sekken Co., Ltd. | $5.0 \times 10^8$ | $1.4 \times 10^9$ | o | x~Δ |
| Example 29 | Sheet Production Ex. 1 | 50 | 50 | Chemistat 6300 produced by Sanyo Kasei Kogyo Co., Ltd. | $5.0 \times 10^8$ | $2.0 \times 10^8$ | o | Δ~o |
| Example 30 | Sheet Production Ex. 1 | 50 | 50 | Elecold PQA produced by Soken Kagaku Co., Ltd. | $5.0 \times 10^8$ | $1.3 \times 10^8$ | o | Δ~o |
| Example 31 | Sheet Production Ex. 5 | 60 | 40 | Elecold PQA produced by Soken Kagaku Co., Ltd. | $8.0 \times 10^8$ | $1.3 \times 10^8$ | o | Δ~o |

| | Laminate for a Heat-Insulating Material | | | | | | |
|---|---|---|---|---|---|---|---|
| | Surface Resistivity (Ω · cm) | | Attachment of Ash | | Anti-Blocking Property | | Adhesion |
| Run No. | Reverse Side | Obverse Side | Reverse Side | Obverse Side | Reverse Side | Obverse Side | Reverse Side |
| Example 25 | $7.5 \times 10^{11}$ | $6.2 \times 10^{11}$ | o | o | o | Δ | o |
| Example 26 | $3.8 \times 10^{11}$ | $3.4 \times 10^{11}$ | o | o | o | Δ | o |
| Example 27 | $6.5 \times 10^{11}$ | $5.8 \times 10^{11}$ | o | o | o | Δ | o |
| Example 28 | $8.8 \times 10^{11}$ | $6.0 \times 10^{11}$ | o | o | o | Δ | o |

TABLE 6-continued

| | | | | | | | |
|---|---|---|---|---|---|---|---|
| Example 29 | $3.2 \times 10^{11}$ | $3.8 \times 10^{11}$ | ○ | ○ | ○ | ○ | ○ |
| Example 30 | $3.5 \times 10^{11}$ | $2.6 \times 10^{11}$ | ○ | ○ | ○ | ○ | ○ |
| Example 31 | $5.6 \times 10^{12}$ | $2.4 \times 10^{11}$ | Δ | ○ | ○ | ○ | ○ |

While the invention has been described in detail and with reference to specific embodiments thereof, it will be apparent to one skilled in the art that various changes and modifications can be made therein without departing from the spirit and scope thereof.

What is claimed is:

1. A composite heat-insulating material of the structure that an olefin- or styrene-based resin sheet and a urethane foam are laminated on each other with an adhesive containing:
   (A) 20 to 100% by weight of a water-soluble polyimine compound selected from the group consisting of polyethyleneimine, poly(ethyleneimine-urea), and a polyaminepolyamide/ethyleneimine adduct; and
   (b) 80 to 0% by weight of a nitrogen atom-containing cationic or amphoteric polymer.

2. A process for producing a composite heat-insulating material of the structure that an olefin- or styrene-based resin sheet and a urethane foam material are bonded together with an antistatic resin as an adhesive layer, which comprises:
   coating an aqueous solution or dispersion of the antistatic polymer on both sides of the olefin- or styrene-based resin sheet and drying it to form an antistatic resin layer on each side, and said antistatic polymer comprising:
   (A) 20 to 80% by weight of a water-soluble polyimine compound selected from the group consisting of polyethyleneimine, poly(ethyleneimine-urea) and a polyaminepolyamide/ethyleneimine adduct, and
   (B) 80 to 20% by weight of a nitrogen atom-containing cationic or amphoteric polymer,
   subjecting the sheet to differetial pressure molding;
   applying an expandable urethane solution on the back of the above-produced mold; and
   expanding and hardening the expandable urethane solution.

3. The composite heat-insulating material as claimed in claim 1, wherein the component (B) is an amphoteric compound derived by modification with an amphoterizing agent of a tertiary nitrogen atom of a polymer comprising:
   (a) 20 to 40% by weight of a monomer represented by the formula:

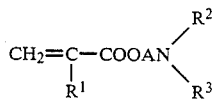

(b) 60 to 80% by weight of a monomer represented by the formula:

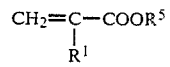

(c) 0 to 20% by weight of another hydrophobic vinyl monomer,
   wherein $R^1$ is H or $CH_3$, $R^2$ and $R^3$ are each H or an alkyl group having from 1 to 2 carbon atoms, $R^5$ is an alkyl group having from 1 to 18 carbon atoms, and A is an alkylene group having from 2 to 6 carbon atoms.

4. The process as claimed in claim 2, wherein the component (B) is an amphoteric compound derived by modification with an amphoterizing agent of a tertiary nitrogen atom of a polymer comprising:
   (a) 20 to 40% by weight of a monomer represented by the formula:

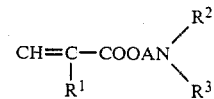

(b) 60 to 80% by weight of a monomer represented by the formula:

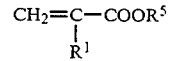

(c) 0 to 20% by weight of another hydrophobic vinyl monomer,
   wherein $R^1$ is H or $CH_3$, $R^2$ and $R^3$ are each H or an alkyl group having from 1 to 2 carbon atoms, $R^5$ is an alkyl group having from 1 to 18 carbon aoms, and A is an alkylene group having from 2 to 6 carbon atoms.

5. The composite heat-insulating material as claimed in claim 1, wherein the olefin- or styrene-based resin sheet is made of one or more of polypropylene, polystyrene, an acrylonitrile/butadiene/styrene copolymer, a styrene/butadiene/styrene block copolymer, and polyethylene.

6. The process as claimed in claim 2, wherein the olefin- or styrene-based resin sheet is made of one or more of polypropylene, polystyrene, an acrylonitrile/butadiene/styrene copolymer, a styrene/butadiene/styrene block copolymer, and polyethylene.

* * * * *